United States Patent

Capucio

[11] 3,981,263
[45] Sept. 21, 1976

[54] BLINKING REFLECTOR SIGNAL DEVICE

[76] Inventor: Eugene G. Capucio, P.O. Box 1087, Caracas, Venezuela

[22] Filed: Apr. 8, 1974

[21] Appl. No.: 458,503

[52] U.S. Cl. .............................. 116/63 P; 240/2.25
[51] Int. Cl.² .......................................... E01F 9/10
[58] Field of Search ............ 116/63 R, 63 P, 124 B; 240/2.25, 8.18, 9, 44.2, 48, 49, 103 R; 340/283, 321; 350/99, 100

[56] References Cited
UNITED STATES PATENTS

| | | |
|---|---|---|
| 1,447,589 | 3/1923 | Leech et al. .................. 240/2.25 X |
| 1,974,832 | 9/1934 | Peterson ........................... 240/2.25 |
| 2,115,271 | 4/1938 | La Londe ......................... 350/99 X |
| 2,487,727 | 11/1949 | Pruver ............................... 240/48 X |
| 2,948,257 | 8/1960 | Levey ................................ 116/63 P |
| 3,006,251 | 10/1961 | Wells .................................... 350/99 |

Primary Examiner—Fred L. Braun

[57] ABSTRACT

A blinking light reflector for imparting a flashing signal to a viewer is provided having a reflective or luminescent bulb which oscillates in position with respect to a cooperating reflective surface.

15 Claims, 4 Drawing Figures

BLINKING REFLECTOR SIGNAL DEVICE

BACKGROUND OF THE INVENTION

Flashing lights have often been used to indicate danger or emergency to persons approaching the light. These lights are usually operated by a power source such as a battery, internal combustion engine, normal electrical source, etc. Even though these power sources are complex and expensive, they have been required to operate a glowing bulb such as an electric light in combination with some type of electrical flashing device. In spite of their complexity and expense, these devices deteriorate and cannot be depended upon for use in an emergency.

With particular reference to motor vehicles, flares have been used to indicate a disabled vehicle or some other emergency situation. These flares are usually placed some distance away from the place where the vehicle is stopped. Depending on the terrain, often the flares will be out of view of the operator who has placed them. Consequently, when the flares have burned out the operator will not be aware of that fact putting him in a perilous position as oncoming cars will not be warned of the approaching situation.

Similar problems arise with battery operated flashing devices. Often they are stored for long periods of time before being used resulting in deterioration of the battery. When the device is finally used it may not work properly, if at all.

SUMMARY OF THE INVENTION

The invention relates to a blinking light reflector including a generally concave member having a highly polished reflective surface and a reflective or luminescent member supported within a housing. The luminescent or reflective member and the reflective surface are mounted to provide relative oscillatory movement with respect to each other. An opening is provided in the housing for exposing the luminescent member and concave surface to a light source such as automobile headlamps so that a flashing appearance is imparted to the viewer in the vicinity of the blinking reflector.

DETAILED DESCRIPTION OF THE PREFERRED EMBODIMENTS

Figure 1:
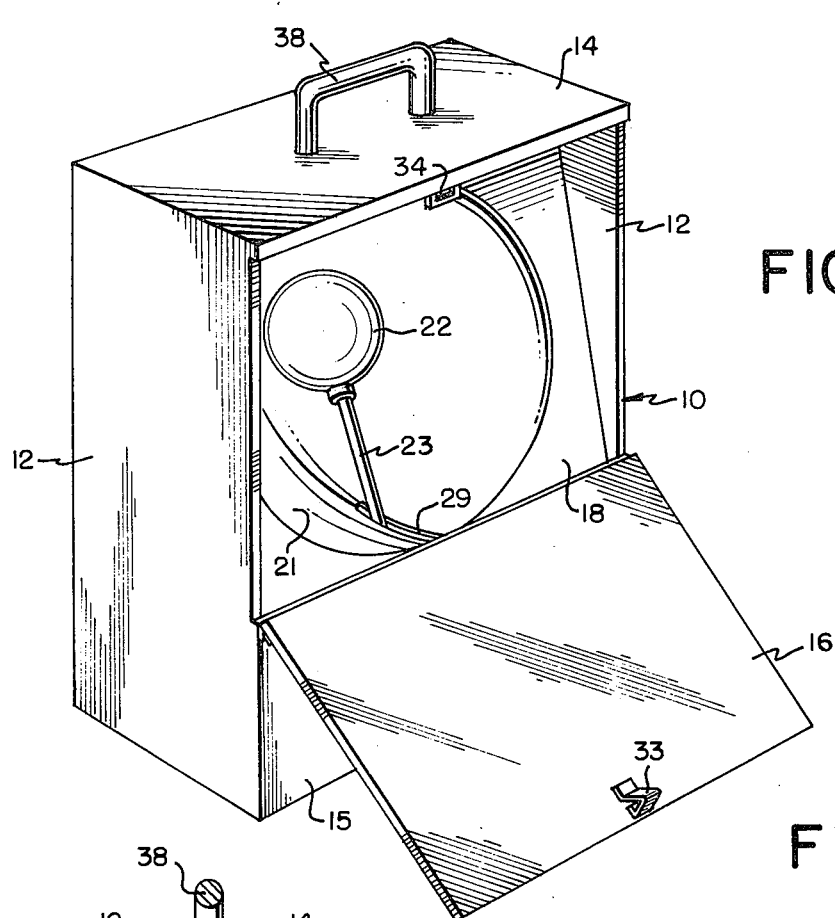
FIG. 1 is a perspective view of the portable blinker light.

The assembled blinker light is supported in housing 10 as shown in FIG. 1. The housing is of a generally rectangular configuration comprised of rigid members having a bottom panel 11, two side panels 12, a back panel 13, and a top panel 14, fixedly secured to each other. There is also provided a front portion which consists of a stationary portion 15 and a movable portion 16. When closed to the remainder of the housing, movable portion 16, in combination with the stationary portion 14, completely closes the flasher light assembly.

Figure 2:
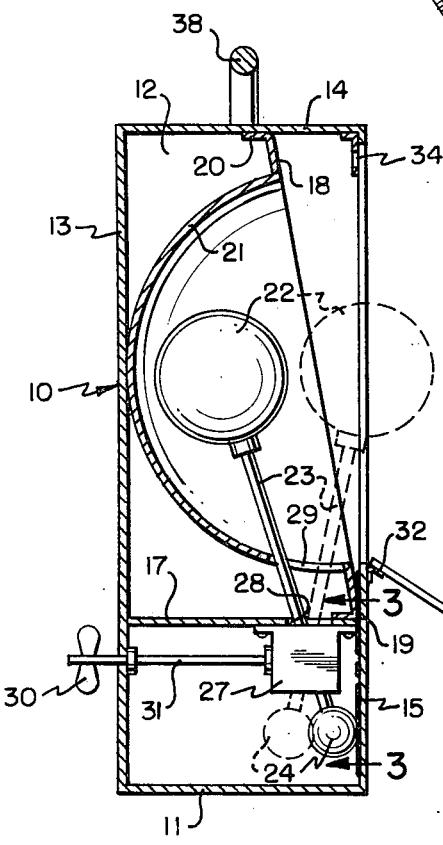
FIG. 2 is a side view of the blinker light with a side panel removed exposing the internal elements.

In the lower portion of the housing, as can be seen in FIG. 2, a support member 17 is fixed to the back panel 13 and stationary front panel 15 in a plane parallel with the bottom panel 11. A planar member 18 is connected to the intersection 19 of the support member 17 and the stationary front panel 15. The planar member 18 extends the entire length of the housing between the two side panels 12 and is affixed to the top panel 14 midway between the front and rear portions of the housing by bracket 20. In the center of the planar member there is provided a hemispherical concave surface 21. The hemispherical surface is preferably made from a highly polished aluminum and extends toward the back of the housing. The concave surface faces toward the open portion of the housing so that it is readily exposed to external sources of light.

By using the polished surface as described a highly reflective surface is obtained. Thus, even subdued light entering the opening is readily reflected. By having the hemispherical surface attached to the planar member angled as described, more of the light received in the hemisphere will be directed upward upon being reflected. This is an advantage which will become apparent later in the description herein.

Figure 3:
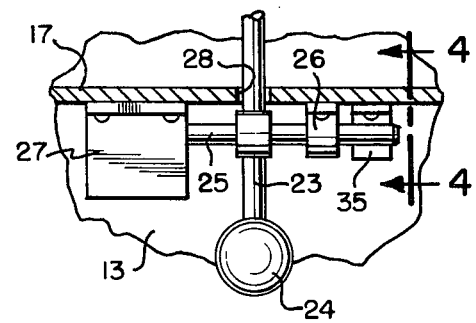
FIG. 3 is an exploded partial view of the oscillating mechanism shown in FIG. 2.

A sphere 22, somewhat smaller in diameter than the hemispherical concave surface, is secured to one end of rod 23. At the other end of rod 23 is attached a counterweight 24 which is approximately the same weight as the sphere. The rod is pivotally attached at some point intermediate the sphere and the counterweight to pivot shaft 25. In this manner, a pendulum effect is created. With reference to FIG. 3, the pivot shaft 25 at one end is journalled by journal member 26, and at its other end it is integrated with a clockwork mechanism 27. The clockwork mechanism rotates the pivot shaft in a manner which causes the sphere to be oscillated toward and away from the hemispherical surface. Slots 28 and 29 are provided in the support member 17 and the concave surface 21, respectively, which have a length longer than that needed for oscillation of the rod. The support member 17 provides a surface to which the journal 26 and the clockwork mechanism 27 are fixed.

The sphere itself is coated with either a luminescent material of a type which is usually activated by light having a wavelength in the visible range or a reflective material such as SCOTCHLITE manufactured by 3M. When light is imparted to the coated sphere a luminous or reflective effect is produced. As the sphere is moved toward the concave surface the luminous or light reflecting sphere is magnified several times by the reflective surface of the hemisphere. Conversely, as the sphere moves away the magnification decreases. This change in magnification produces an intermittent flashing or blinking effect which serves as a warning signal. The luminiferous or reflective effect is enhanced by coating exposed internal portions of the housing exclusive of the concave reflecting surface. When exposed to even slight amount of light, the intermittent flashing effect is produced and distinctly discernable from a substantial distance.

The clockwork mechanism is the typical spring loaded type well known in the art obviating further discussion herein. A key 30 is provided externally of the housing for winding of the clock mechanism. The key is attached to the mechanism through rod 31. Thus, the blinker light can be set into action merely by winding of the clockwork mechanism by key 30. The clockwork mechanism is such that when the spherical member is prevented from oscillating to its maximum stroke by some mechanical means as the front portion of the housing the mechanism will stop. The movable front portion 16 is hinged along the stationary portion 15 at hinge 32. At the top of the movable portion there is provided a spring clip 33 to cooperate with catch 34 which iss secured to the top panel 14 of the housing. The movable portion when snapped in a closed position cooperates with the oscillating mechanism to prevent oscillation. The oscillation of the coated sphere in the forward position is shown beyond the plane of the front portion of the housing by dotted lines. In this manner, when the front portion is closed the sphere cannot obtain its maximum forward extension, thus stopping the operation of the clockwork mechanism and its accompanying oscillation.

Thus, the blinker light can be used as an automatic device in the case of emergency. The blinker light can be prewound while the movable front portion is in a closed position. When an emergency arises the blinker light can simply be set in the appropriate place and the movable front portion opened initiating operation of the blinker light without any further action required by the user. In this manner, the blinker light can be set into action quickly and efficiently. Because a clockwork mechanism is used rather than more sophisticated electrical devices, a much more dependable operation is achieved as the user does not have to be apprehensive about deterioration of the working parts.

Figure 4:
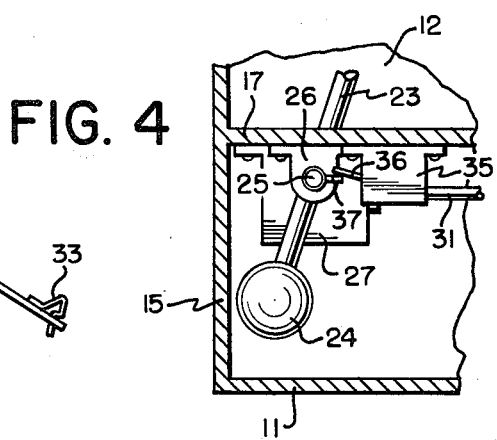
FIG. 4 is an exploded partial view of the oscillating mechanism of FIG. 2 including an audio element.

In addition, as can be seen in FIG. 4, the mechanism is provided with an audio device 35 having a switch arm 36 which is operated by extension 37 attached to pivot shaft 25. When the oscillating mechanism is in the operative mode the extension operates the switch arm 36 which, in turn, causes the audio device to produce an intermittent clicking sound. When the clockwork mechanism eventually runs down, the clicker, of course, stops. In this manner, the user knows when the blinker is not operating since the warning clicking sound will have ceased. The user can then rewind the clockwork mechanism to return the blinking light to an operative mode. Although the audio device as described produces a "clicking" sound, any type of sound-producing device can be used.

The advantages of such an audio device is that it provides the user of the blinker light with knowledge of whether oncoming vehicles are being properly warned. In the case of flares and battery operated devices, no such warning is provided. Consequently the user may be put in a precarious position of having to operate in an emergency situation without proper warning being given to the oncoming vehicles and without his knowing that his warning device no longer is operating. In the instant device the use can take whatever action is necessary, preferably rewinding the clockwork mechanism to ensure that he is properly protected when the mechanism stops.

A handle 38 is attached to the top 14 of housing 10. This allows the blinker light to be easily carried from one place to another. This portability feature enhances the blinker light for use as a warning device as it can readily be carried to the desired spot to give warning to oncoming traffic.

The device is usually kept in the wound position, but with the movable front portion of the housing closed to prevent oscillation. In this prewound condition, the blinker light can be stored in an automobile until it is ready for use. In case of an emergency such as a flat tire, the blinker light is withdrawn from its storage place and carried by the handle to a position, usually 30 - 50 feet, behind the vehicle where it is placed on or near the roadway. The movable front portion is then merely flipped open to expose the flashing element and to initiate operation.

In daylight or moonlight there is enough light for the blinker light to operate effectively. When there is no moonlight at night the blinker light will operate from the headlights of the approaching vehicles. Because of the angularity of the planar element as described above, the flashing luminiferous glow is directed upward such that it can be more readily viewed by oncoming traffic. While the user is changing a tire he is made aware that the blinker light is operating properly through the clicker sound produced.

The blinking reflector of the present invention may also be advantageously used as warning markers for marine buoys with tidal or wave motion being used to move the luminescent or reflective element relative to the reflective surface.

In the preferred embodiment set forth herein, a concave spherical reflector is described and illustrated. It will be understood that other directional reflective surfaces may be utilized such as corner type, paraboloid, etc. It will also be understood that the oscillating mechanism may be powered by other means such as solar cell charged batteries and the like. It will further be recognized that the present invention also contemplates a structural arrangement that provides relative movement between the reflective or luminescent member and the reflector surface, including one in which the reflector is moved relative to a fixed position luminescent or reflective member.

I claim:
1. A blinking light reflector comprising:
  a. a housing;
  b. a directional light reflector surface within said housing;
  c. a luminescent member;
  d. oscillating means for periodically moving said luminescent member at regular intervals toward and away from said reflector surface;
  e. opening means in said housing for exposing said surface and said luminescent member to an external light source; and
  f. said reflector surface being a highly polished concave surface and shaped for magnifying the luminsecent member at each movement of said member toward the reflector surface such that an intermittent flashing is produced by a change in magnification as said luminescent member is moved toward and away from said reflector surface.

2. The blinking light reflector according to claim 1, wherein said luminescent member is a sphere.

3. A blinking light reflector comprising:
  a. a housing;
  b. a directional light reflector surface within said housing;
  c. a light reflecting member;
  d. oscillating means for periodically moving said light reflecting member at regular intervals toward and away from said reflector surface;
  e. opening means in said housing for exposing said surface and said light reflecting member to an external light source; and
  f. said reflector surface being a highly polished surface shaped for magnifying the light reflecting member at each movement of said member toward the reflector surface such that an intermittent flashing is produced by a change in magnification as said light reflecting member is moved toward and away from said reflector surface.

4. A blinking light reflector comprising:
   a. a housing;
   b. a directional light reflector surface within said housing;
   c. a luminescent member;
   d. an oscillating means for periodically moving said luminescent member toward and away from said reflector surface;
   e. means in said housing for exposing said surface and said luminescent member including a removable panel which in a closed position prevents exposure of said luminescent member and said reflector surface and in an open position exposes said luminescent member and said reflector surface such that they can be subjected to an external light source; and
   f. said removable panel cooperating with the oscillating means for initiating oscillation when said panel is moved to the open position and preventing oscillation when moved to the closed position.

5. A blinking light reflector according to claim 4 further comprising an audio device cooperating with said oscillating means for transmitting an audio signal that can be heard by the human ear, said audio device cooperating with said oscillating means for producing said signal while said oscillating means is in operation and producing no signal when said oscillating means has ceased to operate.

6. A blinking light reflector comprising:
   a. a housing;
   b. a directional light reflector surface within said housing;
   c. a luminescent member having the form of a sphere;
   d. oscillating means for periodically moving said luminescent member toward and away from said reflector surface;
   e. opening means in said housing for exposing said surface and said luminescent member to an external light source;
   f. said reflector surface being a highly polished concave surface and shaped for magnifying said luminescent member at each movement of said member toward the reflector surface; and
   g. wherein said oscillating means comprises a rod, a counterweight attached to one end of the rod, said sphere being attached at the other end of the rod, said rod being pivotally attached to a pivot means intermediate said counterweight and said sphere, a clockwork mechanism cooperating with said rod for pivoting the rod about said pivot means to produce an oscillation of said sphere toward and away from the concave surface.

7. The blinking light reflector according to claim 6 wherein said housing is comprised of rigid members including:
   a. a top panel, two side panels, a front panel, a rear panel and a bottom panel fixedly secured to one another to form a rectangular box;
   b. said opening means in said housing includes said front panel being provided with an aperture for exposing said concave surface and said spherical member;
   c. a support member secured in the bottom portion of the housing for supporting said clockwork mechanism;
   d. a slot provided in said support member and said concave surface to allow movement of said rod during oscillation of said spherical member; and
   e. said support member being located a sufficient distance above the bottom panel to allow for movement of said counterweight during said oscillation.

8. A blinking light reflector comprising:
   a. a housing;
   b. a directional light reflector surface within said housing;
   c. a luminescent sphere;
   d. an oscillating means for periodically moving said luminescent sphere toward and away from said reflector surface;
   e. said oscillating means including a rod, a counterweight attached to one end of the rod, said luminescent sphere being attached at the other end of the rod, the rod being pivotally attached to a pivot means intermediate said counterweight and said sphere, a clockwork mechanism cooperating with said rod for pivoting the rod about said pivot means to produce an oscillation of said sphere toward and away from said reflector;
   f. said reflector surface being a highly polished concave surface such that a reflection of the sphere is magnified by each movement of said sphere toward the reflector surface, and
   g. said housing including:
      (a) a top panel, two side panels, a front panel, a rear panel and a bottom panel fixedly secured to one another to form a rectangular box;
      (b) said front panel being provided with an opening for exposing said concave surface and said sphere;
      (c) a support member secured in the bottom portion of the housing for supporting said clockwork mechanism;
      (d) a slot provided in said support member to allow for movement of said rod during oscillation of said sphere; and
      (e) said support member being located a sufficient distance above the bottom panel to allow for movement of said counterweight during said oscillation.

9. The blinking light reflector according to claim 8, further comprising a key means extending external of said housing for winding of said clockwork mechanism.

10. The blinking light reflector according to claim 9, wherein said concave surface is a hemisphere.

11. The blinking light reflector according to claim 10, wherein said hemisphere is attached to a planar surface and said sphere is oscillated in its inward movement to a position where it is completely circumscribed by the concave surface of the hemisphere and the plane defined by said planar surface.

12. The blinking light reflector according to claim 11 further comprising a movable panel hinged along said front panel, said movable panel having securing means for securing the movable panel to the top panel of the housing such that the exposed portion can be completely closed when the movable panel is secured to the top panel.

13. The blinking light reflector according to claim 12, wherein:

a. said means for oscillating includes moving the luminescent sphere in its maximum forward movement to a position where at least a portion of the sphere extends beyond the plane defined by the front panel of the housing;
b. said sphere and rod assembly cooperate with said clockwork mechanism for stopping the oscillation thereof when said assembly is prevented from achieving its maximum oscillation; and
c. means are provided for preventing said assembly from reaching its maximum oscillation.

14. The blinking light reflector according to claim 13, wherein said means for stopping includes said movable panel such that when the movable panel is moved to a closed postion the clockwork mechanism is stopped and as the movable panel is moved to an open position the clockwork mechanism is allowed to reach its maximum oscillation.

15. The blinking light reflector according to claim 14, comprising a handle attached to the top of said housing for carrying said blinker light.

* * * * *